Figure 1:
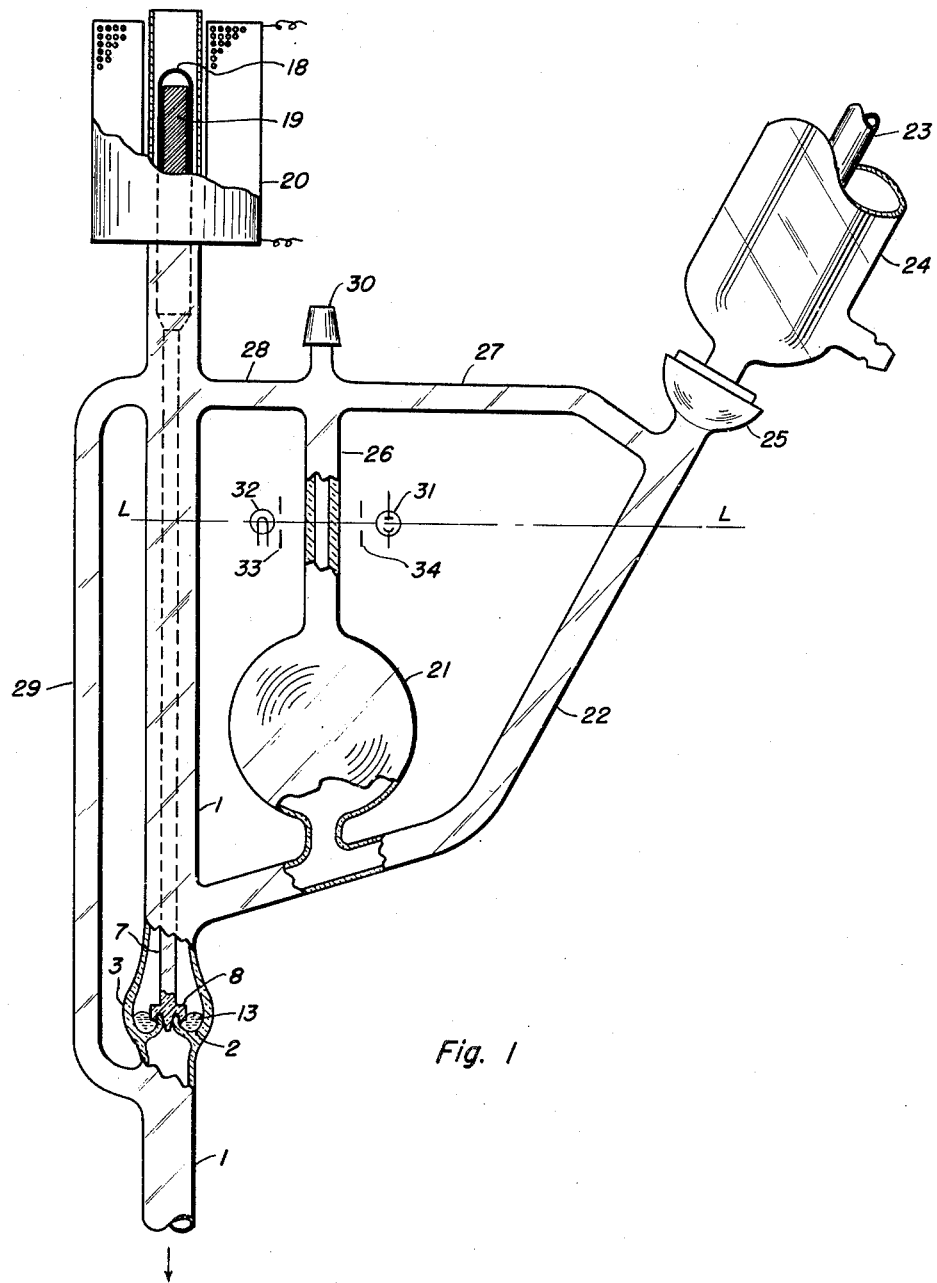

June 23, 1953  R. D. HARRISON ET AL  2,642,891
MERCURY SEALED VALVE
Filed Aug. 22, 1950　　　　　　　　　　　　2 Sheets-Sheet 2
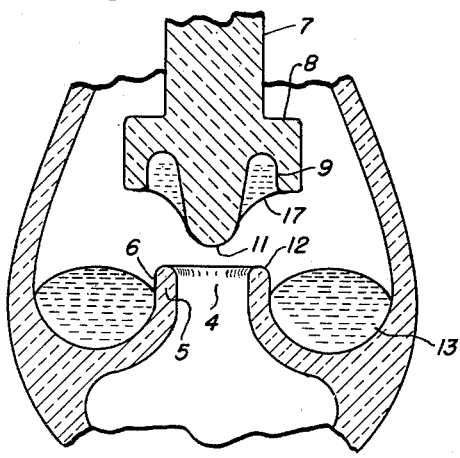
Fig. 4
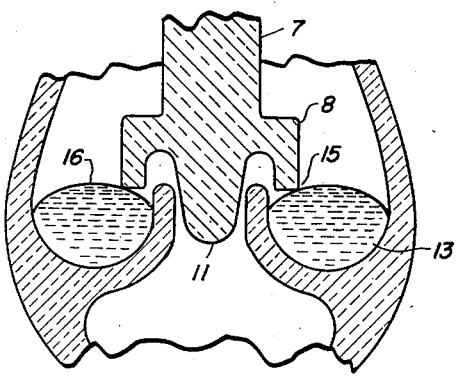
Fig. 5
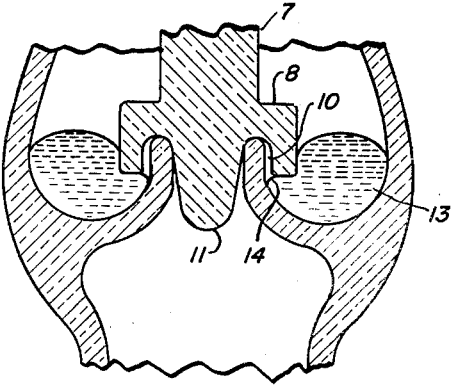
Fig. 6
Fig. 2
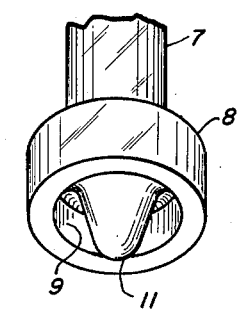
Fig. 3
INVENTORS:
ROBERT D. HARRISON
HARRY G. HALL
BY Thomas G. Bell
AGENT Patented June 23, 1953

2,642,891

UNITED STATES PATENT OFFICE 2,642,891

MERCURY SEALED VALVE

Robert D. Harrison, Orinda, and Harry G. Hall, Martinez, Calif., assignors to Tide Water Associated Oil Company, San Francisco, Calif., a corporation of Delaware Application August 22, 1950, Serial No. 180,824

7 Claims. (Cl. 137—248)

This invention relates to valves for controlling the flow of fluids, especially liquids, under moderate pressures especially in laboratory glass apparatus and is particularly adapted to control the discharge from automatic pipettes such as those used to measure the distillate from automatic stills although its use is not necessarily limited thereto. The invention comprehends an improved form of valve and seat in combination with an improved mercury seal whereby various operating disadvantages inherent in other valves are overcome.

In our copending application, Serial Number 89,841, filed April 27, 1949, now abandoned, there is described for similar uses a valve over which the valve of the present invention is an improvement. Briefly, the valve of said copending application comprises a vertical tube containing, as a valve seat, an annular cup containing an annular pool of mercury, or other suitable liquid. Within the vertical tube is a valve stem to which is affixed an inverted cup which, when the valve is closed, seats in the annular liquid pool, providing a seal against the flow of fluid in the tube. The valve stem may extend through an opening in the tube and be operated by any desired means or the valve stem may be affixed to the armature of a solenoid and be entirely sealed within the tube. In the latter case the armature would be actuated by a solenoid preferably placed around the tube. Additional protection against leakage may be obtained by providing a ground seat where the underside of the inverted cup contacts the central lip of the annular well. The annular well is preferably situated in an enlarged portion of the vertical tube. It has been found that valves of this type have two limitations; first, for best results the depth of the mercury pool should be sufficient to provide a hydrostatic head of mercury equal at least to the pressure exerted on the valve by the fluid under control; and, second, there is a tendency toward loss of mercury from the pool due to splashing upon operation of the valve.

The improved valve of the present invention is generally similar to that described above, the improvement residing primarily in the shape and proportions of the inverted cup, the annular lip and the mercury pool whereby the above limitations are overcome. Briefly, the inverted cup is provided with an internal cylindrical surface enclosing, with close clearance, an external cylindrical surface on the annular lip. By this means, as will be more fully set forth herein, the surface tension of the mercury is caused to provide the desired seal, thereby permitting the use of a relatively shallow pool. By proper proportions of the inverted cup, as explained later, the cup may be caused to engage the mercury pool without substantial splashing which might otherwise induce mercury losses from the pool.

An object of the invention is to provide a valve which, in closed position, will furnish a positive seal against the flow of a fluid under low or moderate pressures. Another object is to provide such a valve which can be operated with but a small force. Another object is to provide such a valve which is readily adapted to be constructed primarily from glass tubing. Still another object is to provide such a valve the moving parts of which can be completely sealed within the fluid system thereby preventing any losses of gases or volatile liquids. A still further object is to utilize the surface tension of mercury and its convex meniscus against glass to form a seal in a glass valve. Yet another object is to provide a mercury sealed valve adaptable for use in glass tubing in which the loss of mercury during operation will be minimized. Other objects will be apparent from the following description.

In the accompanying drawings Figure 1 illustrates partly in section the valve in combination with a liquid measuring device. Figure 2 is a greatly enlarged sectional view of the valve proper, omitting the mercury pool for convenience of description. Figure 3 is a perspective view, greatly enlarged, of the inverted annular cup. Figures 4, 5, and 6 are greatly enlarged sectional views of the valve, with mercury present, in open, partly closed, and closed positions, respectively.

In the handling of small volumes of liquids or gases, such as is customary in glass laboratory apparatus, it is at times necessary to restrain the flow of liquids or gases for extended periods of time with no leakage whatsoever and to reestablish the flow at predetermined times by automatic or semi-automatic control. While various forms of stop-cocks give adequate closure against the flow, their operation is generally unsuited for anything but manual operation. Consequently, various types of poppet type valves are in use which are actuated by electro-magnets, or other means, requiring low power and short motion to effectively open and close the valve. In small apparatus these poppet valves usually consist of a glass spheroid ground to seat in a restricted portion of a glass tube. It has been found, however, that these ground seats are not entirely free from leakage, particularly when gases or low-viscosity, penetrating liquids are being handled, and the leakage may be quite substantial when extended periods of time are involved. This is particularly true in the case of automatic laboratory stills which are designed to produce distillate at very low rates (e. g. where high reflux ratios are used) and which are equipped with automatic pipettes for accurately measuring the distillate. In such cases many minutes are sometimes required to fill the measuring pipette during which time efflux from the pipette must be positively shut off, but rapid discharge from the pipette must be readily and automatically established when the pipette has been filled to the proper level. For maximum accuracy and in order to minimize contamination of one sample by the next, a suitable valve for these purposes should be compact and should drain with a minimum hold-up of the measured fluid. Moreover, the valve should be able to operate accurately and dependably for long periods of time without attention.

The valve of the present invention is particularly adapted for use in controlling the efflux of such automatic pipettes; it is provided with an improved mercury seal capable of positively preventing leakage, under the pressures encountered, with minimum displacement of mercury during operation, thereby greatly reducing the possibility of mercury loss during repeated openings and closings of the valve.

Mercury sealed valves of the prior art depend primarily upon a hydrostatic head of mercury to maintain the desired seal. For use in automatic pipettes, and in certain other uses, such valves have the disadvantage of requiring a mercury well deeper than the mercury pool by the amount of the hydrostatic head needed. For example, in an automatic pipette holding a six-inch column of hydrocarbon a mercury sealed valve depending upon the hydrostatic head of mercury for the seal would have to provide for some three-eighths of an inch of mercury head. To do so would necessitate a mercury well three-eighths of an inch deeper than the mercury pool in the well. In open position of the valve, this three-eighths of an inch space would be filled with hydrocarbon hold-up which could not drain. Moreover, to provide a well of this depth within the limitations of the small sized apparatus involved would be inconvenient from a construction viewpoint.

In distinction to the prior art valves, the valve of the present invention depends, for its sealing effect, upon the surface tension of mercury and upon the negative capillary attraction of mercury in contact with glass. With proper construction of valve parts, utilizing this principle, a hydrocarbon head of twelve inches or more can readily be retained by a valve having only a few drops of hydrocarbon hold-up in open position.

Construction of the valve can be understood more readily by reference to the drawings, Figure 1 of which illustrates the valve combined with an automatic pipette adapted for use with an automatic still, while the remaining figures illustrate the valve parts greatly enlarged for better illustration of the details.

In accordance with the invention there is provided a vertical glass tube 1, which forms a conduit through which the hydrocarbon or other fluid passes when the valve is in open position. For the purposes of an automatic pipette, and in various other instances, the diameter of tube 1 is limited in size; for example, in such an automatic pipette in actual use tube 1 is of 10 mm. O. D. and 8 mm. I. D. glass tubing. Within tube 1 there is formed, or otherwise provided, an annular cup or well 2. To provide a well of sufficient diameter tube 1 may be somewhat enlarged as shown at 3. Centrally located in annular cup 2 is orifice 4 formed by the central annular lip 5 of well 2. Orifice 4 may conveniently have a diameter of about 3 mm. when tube 1 is 8 mm. I. D. On the outer surface of annular lip 5 there is formed, by grinding or otherwise, a substantially cylindrical surface 6, furnishing a cylindrical portion with which the valve head cooperates to provide the desired mercury seal. Within tube 1 is valve stem 7 to which is attached (or integrally formed therewith) inverted cup 8. For easy assembly of the valve, the outside diameter of cup 8 should be at least slightly less than the internal diameter of tube 1. Inverted cup 8 is provided with an internal cylindrical surface 9 designed to mate with exterior surface 6 of annular lip 5 when the valve is in closed position. The clearance space 10 between surface 6 and surface 9 is of prime importance in the successful operation of the valve. The fit should not be so "snug" as to prevent smooth operation of the valve; and, on the other hand the clearance should not be so great that mercury will be forced into space 10 under normal pressures encountered during operation. Depending somewhat upon the smoothness of finish of surfaces 6 and 9, the minimum clearance between them should, therefore, be about 0.0005" to 0.001". The maximum permissible clearance depends upon the pressure the valve must retain in closed position. A clearance of 0.02" is approximately the maximum usable clearance when the pressure involved is that exerted by a head of 4 or 5 inches of light petroleum fractions. With greater heads the maximum clearance is correspondingly smaller.

Preferably cup 8 is provided with a central tapered tip 11 which acts to guide cup 8 and stem 7 during closing and, in closed position, centers cup 8 on lip 5 thereby assuring a uniform thickness to annular space 10. Preferably tip 11 should be of such length that it is withdrawn completely from orifice 4 in open position of the valve, as shown in Figure 4. Tip 11 should be shaped so that, in closed position of the valve, it does not bind in orifice 4, the contact between cup 8 and lip 5 being mainly at the rim 12 of lip 5, which rim can conveniently be ground to fit smoothly in cup 8.

In operation, well 2 is provided with a pool of mercury 13 with which cup 8 contacts to form the desired seal. Due to the small dimensions of the apparatus and the surface tension of the mercury, the mercury pool 13 assumes the form of a small, flexible toroid with the exposed surface a convex curve, as shown in Figures 4 and 5. In closed position of the valve, as illustrated in Figure 6, cup 8 distorts the toroid and forces the mercury outward. Due to the small clearance, the mercury does not enter space 10, but forms a seal 14 across the bottom of space 10. The strength of seal 14 depends upon the surface tension of the mercury and its inability to wet the glass. By thus utilizing the sealing effect of the surface of the mercury, a compact valve is obtained capable of preventing leakage under a pressure equal to several millimeters of mercury, attainable with conventional mercury sealed valves only by a corresponding depth of mercury well and inverted cup.

To prevent loss of mercury from well 2 with repeated opening and closing of the valve, it is important that seal 14 is formed near the bottom of cup 8 as illustrated in Figure 6 and that the mercury does not enter space 10. It is also important that, in closing, cup 8 should strike the mercury surface without splashing. This is provided for by so proportioning cup 8 that it first contacts the surface of the mercury at some point 15 more centrally located than the apex 16 of the mercury surface, as is illustrated in Figure 5. By thus contacting the mercury near the center of the toroid, the mercury is pushed out of the way of cup 8 as it descends but retains to a great degree its toroidal form. If some splashing of the mercury occurs, very little if any can enter space 10 due to the close clearance and the cylindrical form of surfaces 6 and 9.

Another feature of the valve which assists in preventing mercury droplets from being splashed into space 10 is illustrated in Figure 4. When in open position, cup 8 retains an annular drop of hydrocarbon as shown at 17. When cup 8 descends, in closing, this retained hydrocarbon is forced out by lip 5 and acts as a wash to keep mercury droplets away from space 10.

Depending upon the particular installation and materials to be handled by the valve, valve-stem 7 may be operated by any desired means. Figure 1 illustrates one form of actuating arrangement wherein a solenoid is used. As shown, the upper end of valve stem 7 terminates in hollow number 18 in which is sealed an iron core 19 constituting the armature of solenoid 20. In Figure 1 the valve is shown in closed position with the solenoid de-energized. In this position cup 8 is seated in contact with mercury pool 13, as described above, and the flow of fluid is cut off. Upon energizing solenoid 20, armature 19 is lifted by the magnetic field, raising stem 7 and cup 8 to the position shown in Figure 4. In this position fluid entering tube 1 will be free to pass downward around cup 8, through orifice 4, and thence out at the bottom of tube 1.

Though the arrangement of tube 1, and stem 7 and solenoid 20 may have many applications for the control of fluids in the laboratory, there is illustrated in Figure 1 a specific application wherein the valve is caused to control the discharge from an automatic pipette.

In Figure 1 measuring bulb 21 is connected as shown to inlet line 22 which, in turn, is connected to valve tube 1 at its lower end and, at its upper end, to a distillate line 23 receiving distillate from a still (not shown). Distillate line 23 is shown as surrounded by cooling jacket 24. A ground glass joint 25 may be used conveniently to connect line 22 to line 23. Bulb 21 terminates at top in tube 26 (preferably a capillary). At a point in tube 1 below the junction with line 22 is located annular well 2 containing mercury pool 13. Seated in well 2 is inverted cup 8 attached to valve stem 7. Tube 1 and stem 7 extend above tube 26 for a sufficient distance to accommodate solenoid 20 and armature 19. Lines 27, 28, and 29 may be added to equalize pressures throughout the system. Tube 1 is shown as open at the top but may be closed by a stopper if desired. The system may be vented if desired by vent 30.

In operation of the apparatus shown in Figure 1, distillate enters line 22 through line 23 and flows down into tube 1 where it is held by valve-cup 8 cooperating with annular pool of mercury 13. Tube 1, bulb 21, and tube 22 gradually fill with distillate as additional distillate enters through line 23. When level L—L is reached, corresponding to a desired volume measurement, the liquid level in tube 26 causes the circuit to solenoid 20 to be closed. This may be accomplished by any suitable means, such as contacts introduced into tube 26 through vent 30. In the drawing this is indicated as being accomplished by the operation of photo-cell 31 actuated by light from lamp 32 passing through tube 26 and slits 33 and 34. Upon energizing of solenoid 20, armature 19 is raised lifting stem 7 and cup 8, opening the valve and permitting the contents of the pipette to drain through the bottom of tube 1 into any desired container (not shown) provided for that purpose. Interposition of a time-delay relay in the circuit of solenoid 20, arranged to hold the circuit closed for a predetermined time, will provide for proper drainage before the valve is again closed and the cycle repeated. If desired a second valve (not shown) arranged to close when valve 8 is open may be placed between line 22 and line 23 to cut off flow from line 23 during the time the pipette is discharging.

From the above description of the system illustrated in Figure 1 it will be readily apparent that any leakage of distillate which might occur during the filling of the pipette (especially in cases where the distillate is produced at very low rates such as when high reflux ratios are used with slow boiling rates in the still) can adversely affect the accuracy of the measurements. Accordingly, the advantages of a valve as represented by the present invention are clearly indicated. Likewise it will be clear that a valve capable of being completely sealed in such a system will be greatly advantageous when the system is used to measure highly volatile liquids.

We claim:

1. A glass valve structure designed to shut off the flow of a fluid against a differential pressure not exceeding a predetermined maximum comprising a tubular housing, an annular well affixed to the interior wall of said housing having an annular lip coaxial with said housing and a central orifice, a movable inverted cup adapted to be inserted into said housing and to encircle said lip with its rim extending into said well, means for withdrawing said cup from said well, and close-fitting cylindrical surfaces on said lip and on said cup at the area of encirclement of said lip by said cup, the clearance between said cylindrical surfaces in closed position of the valve being insufficient to permit mercury to enter therebetween under a differential pressure equal to said predetermined maximum.

2. A mercury sealed glass valve structure adapted to control the flow of liquids in laboratory type apparatus and designed to shut off the flow of a fluid against a differential pressure not exceeding a predetermined maximum comprising: a glass tube adapted to be used in a vertical position and having a short enlarged section intermediate its ends, an internal annular lip integral with said tube forming an annular well within said enlarged section adapted to hold a toroidal pool of mercury, a glass valve stem adapted to be inserted coaxially in said tube, an inverted glass cup coaxial and integral with said stem adapted to at least partially enclose said lip and to extend into said well, close-fitting substantially cylindrical surfaces on said lip and on said cup at the area of encirclement of said lip by said cup, and means whereby said stem may be moved longitudinally to raise said cup above said well, the clearance between said cylindrical surfaces in closed position of the valve being insufficient to permit mercury to enter therebetween under a differential pressure equal to said predetermined maximum.

3. A valve structure according to claim 2 in which the clearance between the cylindrical surfaces is between about 0.0005 inch and about 0.02 inch.

4. A valve structure according to claim 2 in which the inverted glass cup is proportioned sufficiently small that upon lowering into the well the cup rim will first contact a mercury toroid in said well on the central, downward-sloping surface of the toroid.

5. A valve structure according to claim 2 in which the inverted glass cup is provided with a downwardly extending, tapered tip adapted to guide the cup by entry into the orifice formed by the annular lip and proportioned to retain, when the valve is in open position, an annular drop of glass-wettable liquid between said tip and the rim of said cup.

6. A mercury sealed glass valve structure adapted to control the flow of fluids in laboratory type apparatus and designed to shut off the flow of a fluid against a differential pressure not exceeding a predetermined maximum comprising: a glass tube of relatively small diameter adapted to be used in a vertical position having a short enlarged section intermediate its ends, an internal annular lip integral with said tube forming with said tube an annular well within said enlarged section adapted to hold a toroidal pool of mercury, a cylindrical surface located on the exterior of said lip, a longitudinally movable glass rod centrally located in said tube, an inverted glass cup coaxial and integral with said rod near one end thereof adapted to encircle said lip and extend into said well, a cylindrical surface located on the interior of said cup formed to slidably fit the cylindrical surface of said lip, an iron armature within said tube attached rigidly to said rod and adapted to be raised by magnetic force from without said tube, and inlet and outlet ports in said tube one located above and the other below said well; the clearance between said two cylindrical surfaces in closed position of the valve being insufficient to permit mercury to enter therebetween under a differential pressure equal to said predetermined maximum.

7. In a mercury sealed valve designed to shut off the flow of a fluid against a differential pressure not exceeding a predetermined maximum, an orifice formed by a glass member having a substantially cylindrical exterior portion, an inverted glass cup having a substantially cylindrical interior portion adapted to fit said exterior portion, and a mercury-well surrounding said member, the clearance between said two cylindrical portions in closed position of the valve being insufficient to permit mercury to enter therebetween under a differential pressure equal to said predetermined maximum.

ROBERT D. HARRISON.
HARRY G. HALL.

References Cited in the file of this patent

UNITED STATES PATENTS

| Number | Name | Date |
| --- | --- | --- |
| 1,629,961 | Nicholson | May 24, 1927 |
| 1,693,945 | Wildern | Dec. 4, 1928 |
| 2,374,531 | Flory | Apr. 24, 1945 |
| 2,501,461 | Wirth | Mar. 21, 1950 |

FOREIGN PATENTS

| Number | Country | Date |
| --- | --- | --- |
| 2,529 | Great Britain | of 1857 |